United States Patent
Wang et al.

(10) Patent No.: US 10,848,960 B2
(45) Date of Patent: Nov. 24, 2020

(54) METHOD AND SYSTEM FOR INTERACTION BETWEEN AP AND MODEM, AND STORAGE MEDIUM

(71) Applicant: JRD Communication (Shenzhen) LTD., Shenzhen (CN)

(72) Inventors: Gan Wang, Shenzhen (CN); Ruihua Zhang, Shenzhen (CN); Shifeng Cao, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/619,478

(22) PCT Filed: Jun. 5, 2018

(86) PCT No.: PCT/CN2018/089855
§ 371 (c)(1),
(2) Date: Dec. 5, 2019

(87) PCT Pub. No.: WO2018/223936
PCT Pub. Date: Dec. 13, 2018

(65) Prior Publication Data
US 2020/0145812 A1 May 7, 2020

(30) Foreign Application Priority Data
Jun. 5, 2017 (CN) .......................... 2017 1 0415166

(51) Int. Cl.
*H04W 8/18* (2009.01)
*H04B 1/3816* (2015.01)

(52) U.S. Cl.
CPC ............ *H04W 8/18* (2013.01); *H04B 1/3816* (2013.01)

(58) Field of Classification Search
CPC ...................................................... H04W 8/18
USPC ........................................................ 455/418
See application file for complete search history.

(56) References Cited

U.S. PATENT DOCUMENTS

| 10,075,841 | B2 | 9/2018 | Wane | |
|---|---|---|---|---|
| 2016/0007188 | A1 | 1/2016 | Wane | |
| 2016/0007190 | A1* | 1/2016 | Wane | H04W 4/50 455/419 |

(Continued)

FOREIGN PATENT DOCUMENTS

| CN | 102769937 | 11/2012 |
|---|---|---|
| CN | 103914281 | 7/2014 |
| CN | 104066045 | 9/2014 |

(Continued)

OTHER PUBLICATIONS

International Search Report and the Written Opinion dated Aug. 30, 2018 From the International Searching Authority Re. Application No. PCT/CN2018/089855 and Its Translation of Search Report Into English. (9 Pages).

(Continued)

*Primary Examiner* — Joel Ajayi

(57) ABSTRACT

Disclosed are a method and system for interaction between an AP and a Modem. The method comprises: when an AP end sends a message to a Modem end, acquiring a service type corresponding to the message; searching, according to the service type, in pre-set multiple RILD threads for an RILD thread corresponding thereto; and sending the message to the Modem end through the RILD thread.

7 Claims, 2 Drawing Sheets

(56) References Cited

U.S. PATENT DOCUMENTS

2019/0246266 A1    8/2019  Wane

FOREIGN PATENT DOCUMENTS

| CN | 106445072 | 10/2017 |
| CN | 107295497 | 10/2017 |
| WO | WO 2018/223936 | 12/2018 |

OTHER PUBLICATIONS

Wang "Research of Android RIL and Implementation With Wireless Communication Module", Thesis of Master Degree, Taiyuan University of Science and Technology, China, p. 1-65, Jul. 2012 & English Abstract.

* cited by examiner

US 10,848,960 B2

METHOD AND SYSTEM FOR INTERACTION BETWEEN AP AND MODEM, AND STORAGE MEDIUM

RELATED APPLICATIONS

This application is a National Phase of PCT Patent Application No. PCT/CN2018/089855 having International filing date of Jun. 5, 2018, which claims the benefit of priority of Chinese Patent Application No. 201710415166.3 filed on Jun. 5, 2017. The contents of the above applications are all incorporated by reference as if fully set forth herein in their entirety.

FIELD AND BACKGROUND OF THE INVENTION

The present invention relates to a smart terminal technique field, and more particularly to an interaction method and interaction system between an application process and a modem and related storage system.

Communication operations, SIM card related operations, and data task operations of an Android system is done by sending messages from an application process (AP) end to a modem end and then the modem end performs related processes using corresponding modules, such as data task module, SIM module and communication module, and sends the processed data to the AP end of the Android system. In the interaction process between the AP end and the modem end, the AP end needs to send the messages to the RIL end, and the RIL end transforms the messages into AT commands and sends the AT commands to the serial port. When the data are in the serial port, the serial port at the modem end is interrupted. This represents that there are data to be read. The modem end reads the data, analyzes the data, and sends the data to the corresponding modules to process and then collect the processed data. However, when the conventional RIL sends each of the AT commands to the serial port, the modem end is interrupted every time. This reduces the performance of the modem end when the modem has many tasks and thus reduces the performance of the interaction between the AP end and the modem end.

Therefore, the above-mentioned issue needs to be solved.

SUMMARY OF THE INVENTION

Technical Problem

One objective of an embodiment of the present invention is to provide an interaction system and interaction method between AP and modem and related storage medium to solve the above-mentioned problem of low interaction efficiency between the AP end and the modem end.

Technical Solution

According to an embodiment of the present invention, an interaction method between an application process (AP) and a modem is disclosed. The interaction method comprises:

when an application process (AP) end sends a message to a modem end, obtaining a task type corresponding to the message;

looking for a corresponding Radio Interface Layer Daemon (RILD) thread from a plurality of predetermined RILD threads according to the task type;

sending the message to the modem end through the corresponding RILD thread.

Optionally, the interaction method further comprises:

establishing the plurality of predetermined RILD threads between the AP end and the modem end and assigning corresponding task types to the predetermined RILD threads before obtaining the task type corresponding to the message.

Optionally, the plurality of predetermined RILD threads operate at the same time and each of the plurality of predetermined RILD threads maintains a message channel.

Optionally, the step of sending the message to the modem through the corresponding RILD thread comprises:

writing the message into a message channel maintained by the corresponding RILD thread and sending the message to the message channel; and monitoring the message received from the message channel and writing the message into a predetermined serial port to send the message to the modem end.

Optionally, the interaction method further comprises following steps after the step of monitoring the message received from the message channel and writing the message into a predetermined serial port to send the message to the modem end:

when the modem end feedbacks data to the AP end, receiving and analyzing the data to determine a message channel corresponding to the data; and writing the analyzed data into the message channel to feedback the data to the AP end via the corresponding RILD thread.

According to another embodiment of the present invention, an interaction system between an application process (AP) and a modem is disclosed. The interaction system comprises: an application process (AP) end; a modem end; and a Radio Interface Layer (RIL) end. The RIL end comprises: one or more application procedures, a storage device, configured to store the one or more application procedures; and one or more processors, configured to executed the one or more application procedures. The one or more application procedures comprises: an obtaining unit, configured to obtain a task type corresponding to the message when an application process (AP) end sends a message to a modem end; an searching unit, configured to look for a corresponding RILD thread from a plurality of predetermined Radio Interface Layer Daemon (RILD) threads according to the task type; and a sending unit, configured to send the message to the modem end through the corresponding RILD thread.

Optionally, the RIL end further comprises:

a multi-thread creating unit, configured to establish the plurality of predetermined RILD threads between the AP end and the modem end and assign corresponding task types to the predetermined RILD threads before obtaining the task type corresponding to the message.

Optionally, the plurality of predetermined RILD threads operate at the same time and each of the plurality of predetermined RILD threads maintains a message channel.

Optionally, the interaction system further comprises a MUDX end; wherein the sending unit writes the message into a message channel maintained by the corresponding RILD thread and sending the message to the message channel and the MUDX end monitors the message received from the message channel and writing the message into a predetermined serial port to send the message to the modem end.

Optionally, the MUDX end is further configured to receive and analyze the data to determine a message channel corresponding to the data when the modem end feedbacks data to the AP end and to write the analyzed data into the message channel to feedback the data to the AP end via the corresponding RILD thread.

According to another embodiment of the present invention, a storage medium storing a plurality of instructions is disclosed. The plurality of instructions are executable by a processor to perform the following operations:

when an application process (AP) end sends a message to a modem end, obtaining a task type corresponding to the message;

looking for a corresponding Radio Interface Layer Daemon (RILD) thread from a plurality of predetermined RILD threads according to the task type, wherein each of the RILD threads is used to forward a message of a specific task type;

sending the message to the modem end through the corresponding RILD thread.

Optionally, the instructions executable by the processor to perform: before obtaining the task type corresponding to the message, establishing the plurality of predetermined RILD threads between the AP end and the modem end and assigning corresponding task types to the predetermined RILD threads before obtaining the task type corresponding to the message.

Optionally, the operation of establishing the plurality of predetermined RILD threads between the AP end and the modem end and assigning corresponding task types to the predetermined RILD threads before obtaining the task type corresponding to the message comprises:

establishing the plurality of predetermined RILD threads according to the number of task types of messages;

establishing one-to-one correspondence relationship between the RILD threads and the task types; and storing the one-to-one correspondence relationship in a RILD thread table.

Optionally, the plurality of predetermined RILD threads operate at the same time and each of the plurality of predetermined RILD threads maintains a message channel.

Optionally, the operation of sending the message to the modem end through the corresponding RILD thread comprises:

writing the message into a message channel maintained by the corresponding RILD thread and sending the message to the message channel; and monitoring the message received from the message channel and writing the message into a predetermined serial port to send the message to the modem end.

Optionally, the step of writing the message into a message channel maintained by the corresponding RILD thread and sending the message to the message channel and monitoring the message received from the message channel and writing the message into a predetermined serial port to send the message to the modem end comprises:

the RILD transforming the message into an AT command, and writing the AT command into its maintained message channel, which corresponds to an information channel, wherein the information channel is used to send the AT command in the corresponding message channel to the serial port of the modem to send the AT command to the modem end.

Optionally, the information channels are managed by MUXD end, and wherein when the MUXD end determines that the information channel is reading data, the MUXD end reads the data and writes the data into the ttyC0 serial port such that such that multiple messages could be transferred at the same time.

Optionally, after the step of writing the monitored message into the predetermined serial port to send the message to the modem end, the instructions executable by the processor to perform:

receiving and analyzing the data to determine a message channel corresponding to the data when the modem end feedbacks data to the AP end and writing the analyzed data into the message channel to feedback the data to the AP end via the corresponding RILD thread.

Optionally, the steps of receiving and analyzing the data to determine a message channel corresponding to the data when the modem end feedbacks data to the AP end and writing the analyzed data into the message channel to feedback the data to the AP end via the corresponding RILD thread comprise:

when the modem end feedbacks data to the AP end and the ttyC0 serial port of the modem end is interrupted, the MUXD end obtaining the data from the serial port, determining the corresponding message channel according to the task type of the data, and writing the data into the message channel, wherein the RILD thread corresponding to the message channel reads the data and sends the data back to the Android AP end.

Optionally, the step of obtaining the task type of the message comprise:

when the AP end sends the message to the modem end, the AP end sending the message to the RIL end, wherein the RIL end is used to connect the Android AP end to the modem end such that the message from the AP end is forwarded to the modem end; and obtaining the task type of the message by the RIL end, wherein the task types comprise: an Android communication, an SIM card operation, and a data task operation.

Advantageous Effect

In contrast to the conventional art, an embodiment of the present invention provides an interaction method and an interaction system between the AP and the modem. The interaction method comprises: when an application process (AP) end sends a message to a modem end, obtaining a task type corresponding to the message; looking for a corresponding Radio Interface Layer Daemon (RILD) thread from a plurality of predetermined RILD threads according to the task type; and sending the message to the modem end through the corresponding RILD thread. An embodiment of the present invention establishes multiple RILD threads between the AP end and the modem end. Different RILD threads could process information of different tasks. This allows the modem end to simultaneously process information of different tasks in one single interruption and thus raise the interaction efficiency between the AP end and the modem end.

DESCRIPTION OF SPECIFIC EMBODIMENTS OF THE INVENTION

Figure 1:
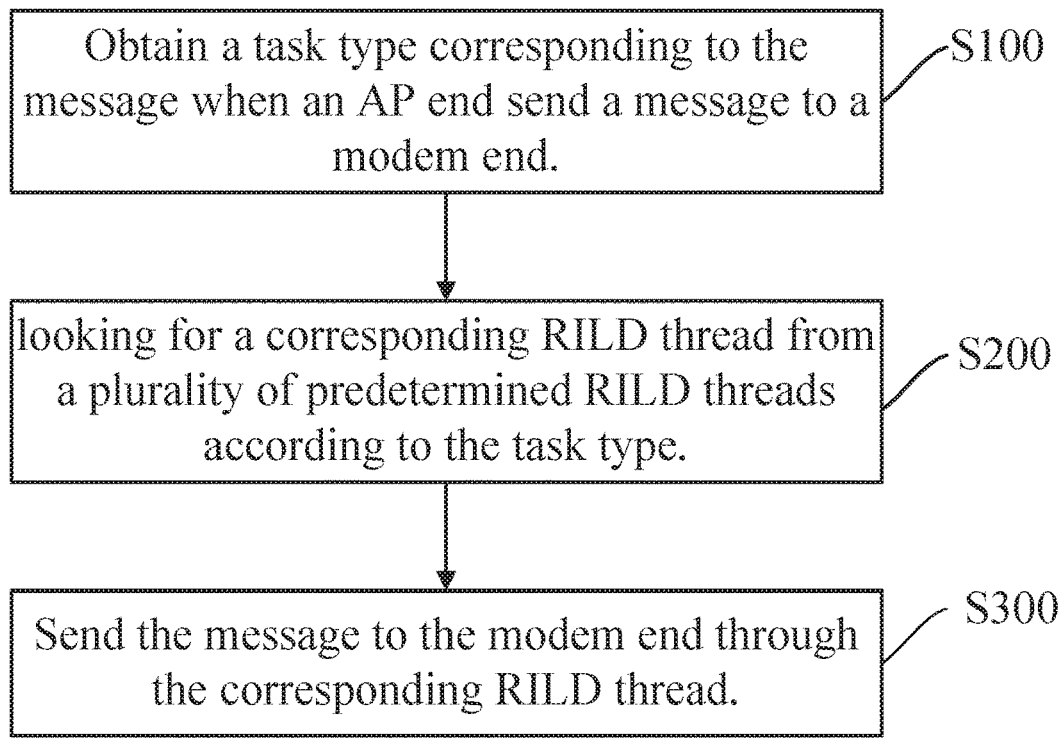
FIG. 1 is a flow chart of an interaction method between the AP and the modem according to an embodiment of the present invention.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

A terminal device could be implemented in various forms. For example, the terminal device could be a mobile terminal, such as a mobile phone, a smart phone, a laptop, a digital radio receiver, a PDA, a PAD, a PMP, or a navigator, or a fixed terminal such as a digital TV, or a desktop computer. In the following disclosure, it could be understood that the present invention could be used in a mobile terminal or a fixed terminal.

Figure 2:
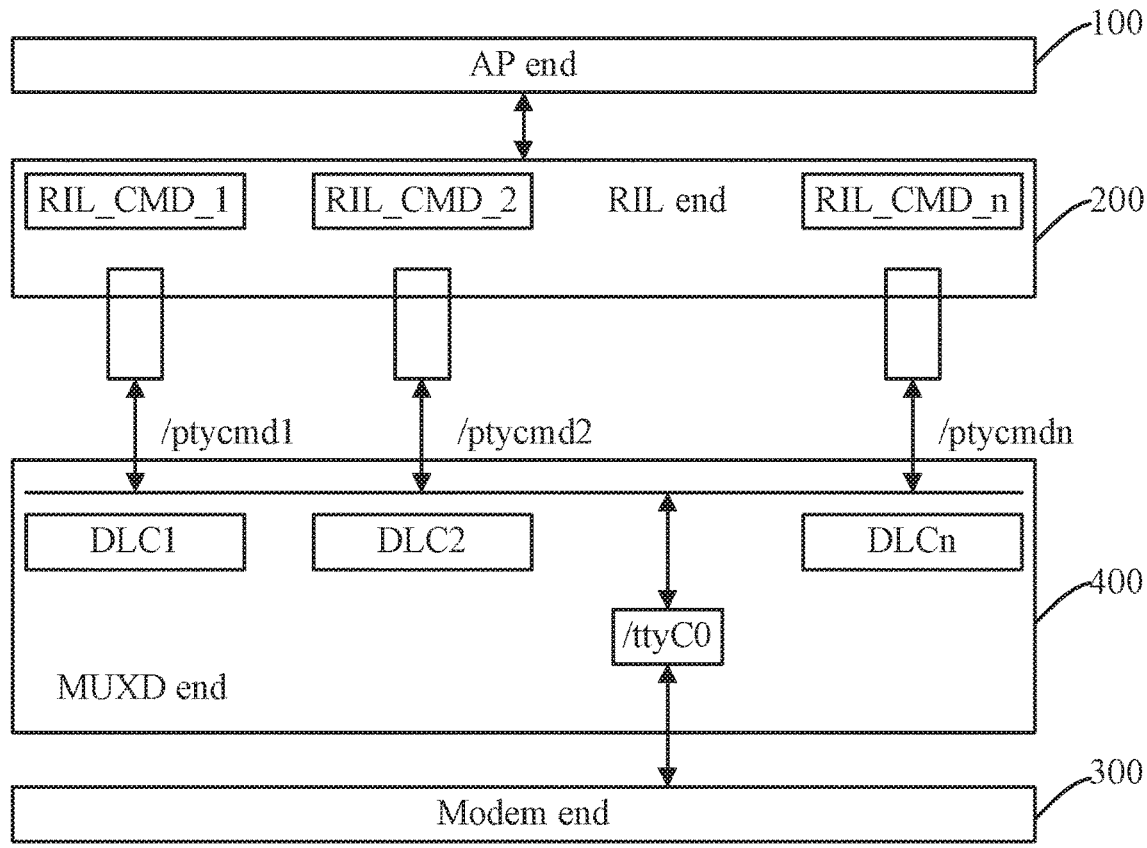
FIG. 2 is a block diagram of an interaction system between the AP and the modem according to an embodiment of the present invention.

Please refer to FIG. 1 in conjunction with FIG. 2. FIG. 1 is a flow chart of an interaction method between the AP and the modem according to an embodiment of the present invention. The interaction method is used in the interaction system shown in FIG. 2. The interaction method comprises:

S100: obtaining a task type corresponding to the message when an application process (AP) end sends a message to a modem end.

The application process (AP) is used for the operations of the user interface and Android operation system. The modem is used for the lower level function of radio frequency communication (audio communication, data task, network connection). The sentence "an application process (AP) end sends a message to a modem end" represents that the AP end sends the message to the RILD thread and the message is sent to the serial port of the modem end via the RILD thread such that the AP end could communicate with the modem through the serial port.

The message could be an Android communication, an SIM card operation, and a data task operation. Correspondingly, the modem end has corresponding modules to process different tasks. In this way, when the AP end sends the message to the modem end, the corresponding task type could be obtained. For example, the task type could be an Android communication, a SIM card operation, and a data task operation. Accordingly, the step of S100 could comprises:

S101: The AP end sends message to the RIL end if the AP end sends the message to the modem end;

S102: The RIL end obtains the task type of the message. The task type at least comprises an Android communication, an SIM card operation, and a data task operation.

The RIL end is used to connect the Android AP end to the modem end such that the message from the AP end could be forwarded to the modem end.

Further, the interaction method further comprises:

S200: looking for a corresponding Radio Interface Layer Daemon (RILD) thread from a plurality of predetermined RILD threads according to the task type.

The plurality of predetermined RILD threads are pre-established and used to forward the message from the AP end to the modem end. Each of the RILD thread is used to forward the message of a specific task type. In other words, the plurality of RILD threads and the task types have a one-to-one correspondence relationship. That is, before the AP end and the modem end communicate with each other, the RILD threads should be established first and the correspondence relationship between the RILD threads and the task types could be respectively established as well.

Therefore, the interaction method could further comprise the following step before the AP end sends the RIL end:

S001: establishing the plurality of predetermined RILD threads between the AP end and the modem end and assigning a corresponding task type to each of the predetermined RILD threads before obtaining the task type corresponding to the message.

Specifically, the RILD threads are established according to the number of the task types of the message from the AP end. Further, the one-to-one correspondence relationship between the RILD threads and the task types is established. The above-mentioned RILD threads could be recorded as RIL_CMD_1, RIL_CMD_2, . . . , RIL_CMD_n. For example, the task types could comprise the above-mentioned Android communication, the SIM card operation, and the data task operation. Accordingly, three RILD threads, RIL_CMD_1, RIL_CMD_2, and RIL_CMD_3 could be established, where RIL_CMD_1 corresponds to the Android communication, RIL_CMD_2, corresponds to the SIM card operation, and RIL_CMD_3 corresponds to the data task operation. In the actual implementation, the correspondence relationship between the RILD threads and the task types could be stored in an RILD thread table. In this way, an RILD thread corresponding to a specific task type could be efficiently determined by looking up the RILD thread table.

When there are multiple RILD threads between the AP end and the modem end, the multiple RILD threads could simultaneously work. In this way, the modem could process messages of different task types at the same time. This not only improves the processing efficiency of the modem but also improves the interaction efficiency between the AP end and the modem end.

Further, the interaction method further comprises:

S300: Sending the message to the modem end through the corresponding RILD thread.

In this step, the RILD thread corresponding to the task type of the message is determined. Then, the message is sent to the modem through the RILD thread.

In the actual implementation, each RILD thread could be used to maintain a corresponding message channel. The message channel could be a document. In other words, when the RILD thread corresponding to the message is determined, the RILD thread sends the message to its maintained message channel Ptycmd. Here, the message channels could be recorded as Ptycmd1, Ptycmd2, . . . , Ptycmdn. That is, the RILD thread sends the message to its corresponding document. Because the RILD threads could simultaneously operates, multiple documents could be written by multiple RILD threads and thus the sending efficiency could be improved.

The step of sending sends the message to the modem end through the RILD thread could comprise:

S301: writing the message into a message channel maintained by the corresponding RILD thread and sending the message to the message channel.

S302: monitoring the message received from the message channel and writing the message into a predetermined serial port to send the message to the modem end.

The RILD thread transform the message into an AT command and write the AT command into its maintained message channel. Moreover, the message channel corresponds to an information channel. The information channel is used to send the AT command in the corresponding message channel to the serial port of the modem such that the AT command could be sent to the modem end. In the actual implementation, the message channels and the information channels have one-to-one correspondence relationship. In addition, the information channels could be managed by MUXD end. In other words, the MUXD end simultaneously monitors multiple information channels, which could be recorded as DLC1, DLC2, . . . , DLCn. When the MUXD end determines that the information channel is reading data, the MUXD end reads the data and writes the data into the ttyC0 serial port such that the AT command is sent to the modem end. In this embodiment, because the RILD threads are plural, the MUXD end could monitor multiple information channels to see if any data are being read. If there are data, the MUXD end could read the data from multiple channels and write the data into the serial port ttyC0 such that multiple messages could be transferred at the same time.

In an embodiment of the present invention, the interaction method could further comprise:

S400: When the modem end feedbacks data to the AP end, the modem end receives and analyzes the data to determine a message channel corresponding to the data.

Step 500: Writing the analyzed data into the message channel to feedback the data to the AP end via the corresponding RILD thread.

When the modem end feedbacks data to the AP end, the ttyC0 serial port of the modem end is interrupted. At this time, the MUXD end obtains the data from the serial port, determines the corresponding message channel according to the task type of the data, and writes the data into the message channel. The RILD thread corresponding to the message channel reads the data and sends the data back to the Android AP end.

Figure 3:
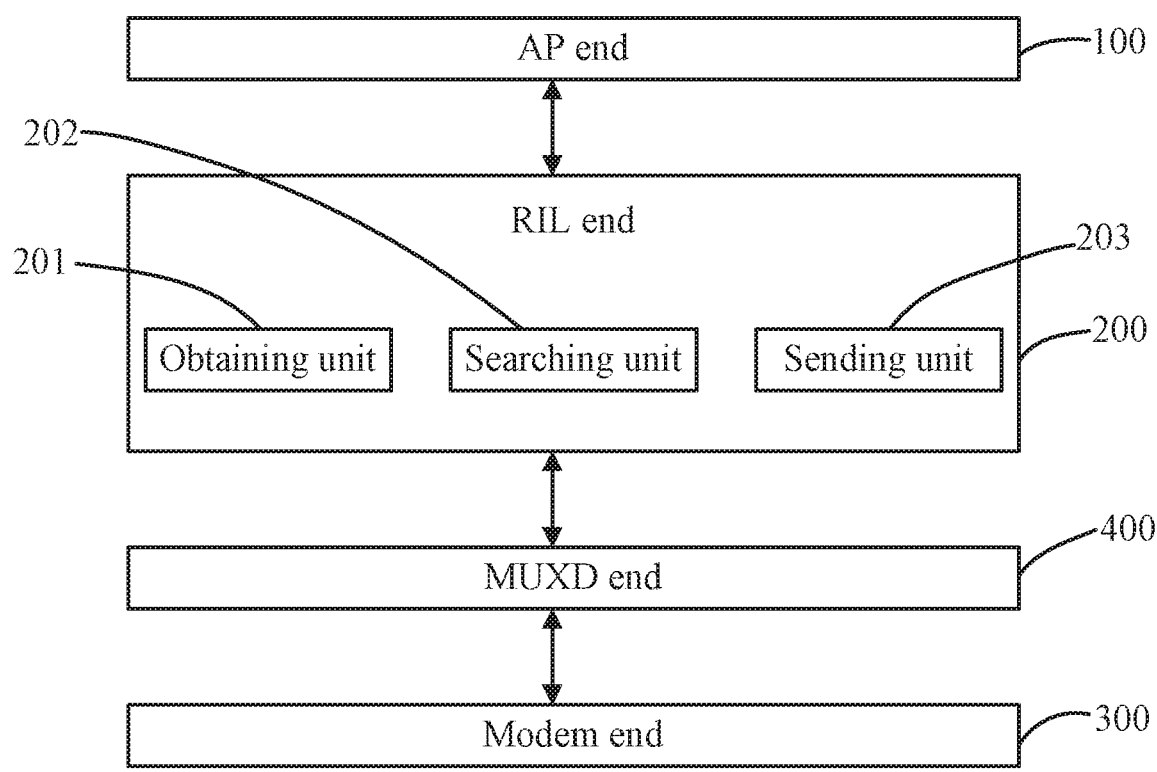
FIG. 3 is a block diagram of a structure of an interaction system between the AP and the modem according to an embodiment of the present invention.

In addition, an interaction system between the AP and modem is disclosed. As shown in FIG. 3, the interaction system comprises an AP end 100, an RIL end 200 and a modem end 300. The RIL end comprises: an obtaining unit 201, a searching unit 202, and a sending unit 203. The obtaining unit 201 is configured to obtain a task type corresponding to a message when an application process (AP) end sends the message to a modem end. The searching unit 202 is configured to look for a corresponding RILD thread from a plurality of predetermined Radio Interface Layer Daemon (RILD) threads according to the task type. The sending unit 203, configured to send the message to the modem end through the corresponding RILD thread.

In addition, the RIL end further comprises: a multi-thread creating unit, configured to establish the plurality of predetermined RILD threads between the AP end and the modem end and assign corresponding task types to the predetermined RILD threads before obtaining the task type corresponding to the message.

In addition, the plurality of RILD threads simultaneously operate and each of the RILD threads maintains a message channel.

The interaction system further comprises a MUDX end 400. The sending unit is used to write the message into a message channel maintained by the corresponding RILD thread and to send the message to the message channel. The MUDX end is used to monitor the message received from the message channel and writing the message into a predetermined serial port to send the message to the modem end.

In addition, the MUDX end is further used to receive and analyze the data to determine a message channel corresponding to the data when the modem end feedbacks data to the AP end and to write the analyzed data into the message channel to feedback the data to the AP end via the corresponding RILD thread.

Since the modules in the interaction system have been illustrated in details in the previous embodiment, further illustration is omitted here.

Further, a storage medium is disclosed according to an embodiment of the present invention. The storage medium stores a plurality of instructions. The instructions are processed by a processor to execute the following steps: when an application process (AP) end sends a message to a modem end, obtaining a task type corresponding to the message; looking for a corresponding Radio Interface Layer Daemon (RILD) thread from a plurality of predetermined RILD threads according to the task type; wherein each of the RILD threads is used to forward a message of a specific task type; sending the message to the modem end through the corresponding RILD thread.

Further, the instructions could be processed to further perform the following steps before obtaining the task type corresponding to the message: establishing the plurality of predetermined RILD threads between the AP end and the modem end and assigning corresponding task types to the predetermined RILD threads before obtaining the task type corresponding to the message.

In addition, the step of establishing the plurality of predetermined RILD threads between the AP end and the modem end and assigning corresponding task types to the predetermined RILD threads before obtaining the task type corresponding to the message comprises: establishing the plurality of predetermined RILD threads according to the number of task types of messages; establishing one-to-one correspondence relationship between the RILD threads and the task types; and storing the one-to-one correspondence relationship in a RILD thread table.

In the storage medium, the step of sending the message to the modem end through the corresponding RILD thread comprises: writing the message into a message channel maintained by the corresponding RILD thread and sending the message to the message channel; and monitoring the message received from the message channel and writing the message into a predetermined serial port to send the message to the modem end.

In addition, the step of writing the message into a message channel maintained by the corresponding RILD thread and sending the message to the message channel and monitoring the message received from the message channel and writing the message into a predetermined serial port to send the message to the modem end comprises: the RILD transforms the message into an AT command, writes the AT command into its maintained message channel, which corresponds to an information channel. The information channel is used to send the AT command in the corresponding message channel to the serial port of the modem to send the AT command to the modem end.

In the storage medium, the information channels are managed by MUXD end. When the MUXD end determines that the information channel is reading data, the MUXD end reads the data and writes the data into the ttyC0 serial port such that such that multiple messages could be transferred at the same time.

The storage medium further comprises instructions to execute the following step after the step of writing the monitored message into the predetermined serial port to send the message to the modem end: receiving and analyzing the data to determine a message channel corresponding to the data when the modem end feedbacks data to the AP end and writing the analyzed data into the message channel to feedback the data to the AP end via the corresponding RILD thread.

Further, in the storage medium, the step of receive and analyze the data to determine a message channel corresponding to the data when the modem end feedbacks data to the AP end and to write the analyzed data into the message channel to feedback the data to the AP end via the corresponding RILD thread could comprise: when the modem end feedbacks data to the AP end, the ttyC0 serial port of the modem end is interrupted. At this time, the MUXD end obtains the data from the serial port, determines the corresponding message channel according to the task type of the data, and writes the data into the message channel. The RILD thread corresponding to the message channel reads the data and sends the data back to the Android AP end.

In the storage medium, the step of obtaining the task type of the message could comprise: when the AP end sends the message to the modem end, the AP end sends the message to the RIL end. The RIL end is used to connect the Android AP end to the modem end such that the message from the AP end could be forwarded to the modem end. In addition, the above-mentioned task types at least comprise: an Android communication, an SIM card operation, and a data task operation.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

It will be understood by those of ordinary skill in the art that all or part of the blocks for implementing the method of the embodiments described above may be accomplished by a program that commands the relevant hardware. The program may be stored in a computer readable storage medium. When the program is executed, one of the blocks of the method embodiment or a combination thereof may be included.

It should be understood that the various parts of the present disclosure may be implemented by using hardware, software, firmware, or combinations thereof. In the above embodiment, the plurality of blocks or methods may be implemented by using software or firmware stored in the memory and executed by a suitable instruction execution system.

The logic and/or blocks described in the flowchart or otherwise described herein, for example, a sequence list of an executable instruction for implementing a logic function, may be implemented in any computer-readable medium for use by an instruction execution system, device or equipment (such as a computer-based system, a system including a processor, or other system that can access instructions from an instruction execution system, device or equipment and execute instructions), or may be used in conjunction with the instruction execution system, device or equipment. As used herein, "computer-readable medium" may be any device that may include a store, communication, broadcast, or transmission program for use by an instruction execution system, device or equipment, or in conjunction with such instruction execution systems, device, or equipment. A more specific example (non-exhaustive list) of the computer-readable medium includes the following: an electrical connection portion (an electronic device) with one or more routing, a portable computer disk cartridge (a magnetic device), a random access memory (RAM), a read only memory (ROM), and a portable compact disc read only memory (CDROM). In addition, the computer-readable medium may even be a paper or other suitable medium on which the program may be printed. For example, through performing an optical scan on the paper or other media, followed by editing, interpretation, or, if necessary, other suitable methods to process, the program is obtained in an electronic manner, and then the program is stored in a computer memory.

Above are embodiments of the present invention, which does not limit the scope of the present invention. Any modifications, equivalent replacements or improvements within the spirit and principles of the embodiment described above should be covered by the protected scope of the invention.

What is claimed is:

1. A non-transitory storage medium storing a plurality of instructions executable by a processor to perform the following operations:
   establishing, according to a number of task types of messages, a plurality of predetermined Radio Interface Layer Daemon (RILD) threads between an application process (AP) end and a modem end;
   establishing one-to-one correspondence relationship between the RILD threads and the task types; and
   storing the one-to-one correspondence relationship in a RILD thread table;
   when the AP end sends a message to the modem end, obtaining a task type corresponding to the message;
   looking for a corresponding Radio Interface Layer Daemon (RILD) thread from the plurality of predetermined RILD threads according to the task type, wherein each of the RILD threads is used to forward a message of a specific task type;
   sending the message to the modem end through the corresponding RILD thread;
   wherein the plurality of predetermined RILD threads operate at the same time and each of the plurality of predetermined RILD threads maintains a message channel.

2. The non-transitory storage medium of claim 1, wherein the operation of sending the message to the modem end through the corresponding RILD thread comprises:
   writing the message into a message channel maintained by the corresponding RILD thread and sending the message to the message channel; and
   monitoring the message received from the message channel and writing the message into a predetermined serial port to send the message to the modem end.

3. The non-transitory storage medium of claim 2, wherein the step of writing the message into a message channel maintained by the corresponding RILD thread and sending the message to the message channel and monitoring the message received from the message channel and writing the message into a predetermined serial port to send the message to the modem end comprises:
   the RILD transforming the message into a command, and writing the command into its maintained message channel, which corresponds to an information channel, wherein the information channel is used to send the command in the corresponding message channel to the serial port of the modem to send the command to the modem end.

4. The non-transitory storage medium of claim 3, wherein the information channels are managed by an intermediate unit between the modem end and the AP end, and wherein when the intermediate unit determines that the information channel is reading data, the intermediate unit reads the data and writes the data into the ttyC0 serial port such that such that multiple messages could be transferred at the same time.

5. The non-transitory storage medium of claim 4, wherein after the step of writing the monitored message into the predetermined serial port to send the message to the modem end, the instructions executable by the processor to perform:

receiving and analyzing the data to determine a message channel corresponding to the data when the modem end feedbacks data to the AP end and writing the analyzed data into the message channel to feedback the data to the AP end via the corresponding RILD thread.

6. The non-transitory storage medium of claim 5, wherein the steps of receiving and analyzing the data to determine a message channel corresponding to the data when the modem end feedbacks data to the AP end and writing the analyzed data into the message channel to feedback the data to the AP end via the corresponding RILD thread comprise:

when the modem end feedbacks data to the AP end and the ttyC0 serial port of the modem end is interrupted, the intermediate unit obtaining the data from the serial port, determining the corresponding message channel according to the task type of the data, and writing the data into the message channel, wherein the RILD thread corresponding to the message channel reads the data and sends the data back to the AP end.

7. The non-transitory storage medium of claim 1, wherein the step of obtaining the task type of the message comprise:

when the AP end sends the message to the modem end, the AP end sending the message to the RIL end, wherein the RIL end is used to connect the AP end to the modem end such that the message from the AP end is forwarded to the modem end; and obtaining the task type of the message by the RIL end, wherein the task types comprise: an Android communication, an SIM card operation, and a data task operation.

\* \* \* \* \*